United States Patent [19]

Gottlieb

[11] Patent Number: 5,453,662
[45] Date of Patent: Sep. 26, 1995

[54] PHOTOCELL SYSTEM FOR AUTOMATIC HEADLIGHT CONTROLLER WITH LIGHT TUBE

[75] Inventor: Mark Gottlieb, Annandale, Va.

[73] Assignee: Designtech International Inc., Springfield, Va.

[21] Appl. No.: 288,009

[22] Filed: Aug. 10, 1994

[51] Int. Cl.⁶ ........................................................ H02G 3/00
[52] U.S. Cl. ............................ 315/82; 315/83; 250/227.11
[58] Field of Search ............................. 315/82, 156, 159, 315/83; 250/227.11, 239

[56] References Cited

U.S. PATENT DOCUMENTS

| | | |
|---|---|---|
| 2,917,665 | 12/1959 | Carpenter et al. . |
| 3,088,051 | 4/1963 | Scanlon . |
| 3,319,116 | 5/1967 | Schick . |
| 3,349,281 | 10/1967 | Collins . |
| 3,423,633 | 1/1969 | Kawai et al. . |
| 3,769,519 | 10/1973 | Adamian ............................ 307/10 LS |
| 4,139,801 | 2/1979 | Linares . |
| 4,181,398 | 1/1980 | Sick ..................................... 350/96.10 |
| 4,236,099 | 11/1980 | Rosenblum . |
| 4,249,160 | 2/1981 | Chilvers . |
| 4,357,558 | 11/1982 | Massoni et al. . |
| 4,376,909 | 3/1983 | Tagami et al. . |
| 4,558,260 | 12/1985 | Masegi . |
| 4,665,321 | 5/1987 | Chang et al. . |
| 4,758,767 | 7/1988 | Blake ...................................... 315/158 |
| 4,968,895 | 11/1990 | Leclercq ................................. 307/10.8 |
| 4,983,883 | 1/1991 | Roland ...................................... 315/77 |

Primary Examiner—Robert J. Pascal
Assistant Examiner—David H. Vu
Attorney, Agent, or Firm—Oblon, Spivak, McClelland, Maier & Neustadt

[57] ABSTRACT

A photocell system for an automatic vehicle headlight controller which can efficiently and accurately activate vehicle headlights. Such a photocell system also operates effectively when mounted behind a grill of a vehicle, and is not dependent on an angle at which the photocell system is mounted. The photocell system features a photocell element which is formed inside a translucent tube. the translucent tube acts as a light diffuser. The photocell then detects the light which is diffused through the translucent tube. As a further feature of the present invention, a vehicle operator can control whether the vehicle headlights should remain on for a predetermined period of time after the vehicle is turned off.

13 Claims, 3 Drawing Sheets

PHOTOCELL SYSTEM FOR AUTOMATIC HEADLIGHT CONTROLLER WITH LIGHT TUBE

BACKGROUND OF THE INVENTION

1. Field of the Invention

The present invention is directed to a photocell system for an automatic headlight activation system for automatically turning on and off headlights of a vehicle at an appropriate timing.

2. Discussion of the Background

Driving a vehicle in the late afternoon as the sun sets or as the weather and visibility worsens can be very dangerous if the operator of the vehicle does not turn on the headlights of the vehicle. In fact, in the United States it is a law to turn on vehicle headlights when it gets dark, and in many states of the United States it is also a law to turn on the vehicle headlights whenever it rains, as it is assumed that the visibility is decreased.

Obviously, all vehicles with headlights have headlight switches. However, such switches require a vehicle operator to remember to turn on the headlights before it is too late. Automatic headlight activators are known in the art. One class of such products will automatically activate vehicle headlights whenever the windshield wipers of a vehicle are energized. Another class of products will automatically activate and deactivate vehicle headlights whenever ambient light conditions fall below or exceed predetermined values. That is, in this second class of products, the headlights will be automatically activated when a certain level of darkness is reached and will be automatically deactivated when a certain level of lightness is reached.

Such conventional products, however, suffer from several drawbacks in their implementation. More particularly, each of these types of products requires a photocell usually mounted somewhere cleanly on a dash of the vehicle. When such photocells are factory installed, their operation is usually satisfactory. However, a significant problem arises for the after market where a customer buys a product and must mount the photocell on the dash of, as an example, a car but must mount the remaining portions of the circuit, i.e., the control for actually turning on and off the vehicle headlights, under the hood area. If the photocell is required to be located on the dash of the car, the vehicle operator must then drill a hole through the fire wall, and run the photocell portion through this hole up on to the dash of the car. In the after market environment, there are no very efficient and aesthetically acceptable ways to mount this photocell on the dash which will not provide a difficult installation, significantly detract from the appearance of the dash or cause damage to the dash. Conventional mounting methods of using double stick tape or screws usually detract from the appearance of the dash of the vehicle.

Such conventional automatic headlight activators usually have another feature in that the headlights can be programmed to remain on for a predetermined period of time after a vehicle is turned off. For example, in the evening when a vehicle operator is ready to get out of the vehicle, it is often convenient to have the headlights of the vehicle stay on for an additional period of time, for example 30 seconds, so that the area around the vehicle is lit when the vehicle operator is leaving the vehicle. Such a system is known in the art. However, such systems suffer from a drawback in that once set they are always operative, regardless of whether the vehicle operator wants such an operation at all times. That is, the problem with such conventional systems is that once the system is set the vehicle headlights will always come on and stay on for the predetermined period of time, for example the 30 seconds, whether the vehicle operator desires this feature or not. The vehicle operator thus does not have control over when this feature should be utilized.

SUMMARY OF THE INVENTION

Accordingly, one object of the present invention is to provide a novel photocell system for an automatic headlight controller which can overcome the drawbacks of the conventional systems.

A further object of the present invention is to provide a novel photocell system for an automatic headlight controller which can be easily mounted behind a grill of a vehicle, and yet still provide a satisfactory performance.

A further object of the present invention is to provide a novel photocell system for an automatic headlight controller in which a vehicle operator can have control whether the headlights of the vehicle will remain on for a predetermined period of time after the vehicle is turned off.

The device of the present invention achieves such objectives by forming a photocell inside of a translucent tube which can be easily mounted behind the grill of the vehicle. The translucent tube diffuses light which impinges thereon, which is then detected by the photocell. As the photocell is formed within the translucent tube, the photocell is effectively protected from dirt. Further, such a photocell can operate effectively at various angles of mounting.

The device of the present invention achieves a further objective of allowing a vehicle operator to control whether the vehicle headlights will remain on for a predetermined period of time after the vehicle is turned off by utilizing an ignition sense wire to sense if the key is in the ignition position in the ignition of the vehicle. According to the present invention, the vehicle headlights will remain on for a predetermined period of time after the vehicle is turned off only after the key is turned back to the ignition (or run) position within a predetermined period of time after the vehicle is turned off, as can be detected by the ignition sense wire.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
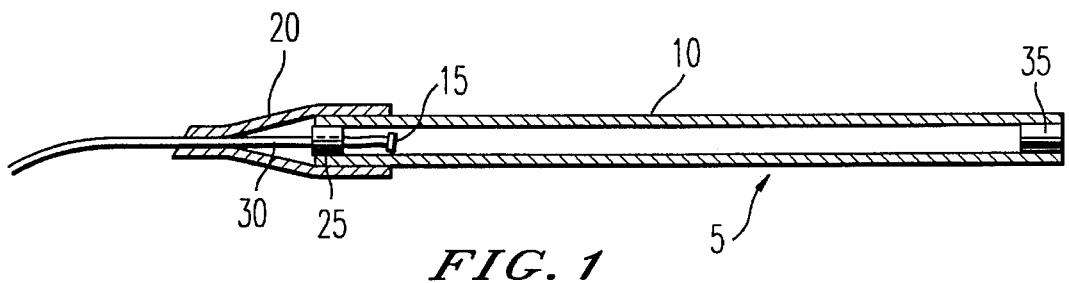
FIG. 1 shows the photocell system for an automatic headlight controller according to the present invention.

Referring now to the drawings, wherein like reference numerals designate identical or corresponding parts throughout the several views, and more particularly to FIG. 1 thereof, there is shown a photocell system 5 for an automatic headlight controller according to the present invention.

As is shown in FIG. 1, the photocell system 5 of the present invention features a photocell 15 which is formed within a translucent tube 10. Formed adjacent to the photocell 15 is a first silicon seal 25, and a second silicon seal 35 is formed at the opposite end of the translucent tube 10. These silicon seals 25, 35 seal the photocell 15 from moisture. A wire 30, such as a twisted pair wire, connects the photocell 15 to a headlight controller (not shown) through the silicon seal. The headlight controller may be any type or brand of conventional headlight controller which turns on or off vehicle headlights when a reading from the photocell 15 falls below or exceeds predetermined levels. A heat shrink tubing 20 is formed around the base of the translucent tube 10 to surround the connection of the wire 30 and photocell 15, to thereby protect this connection. The photocell system 5 of the present invention can be easily mounted behind the grill of a vehicle, and does not need to be mounted on the dash of a vehicle to provide a good performance.

Such a device of the present invention provides significant advantages over conventional systems in which a translucent tube 10 is not utilized. First, and as noted above, such a system does not need to be mounted on a dash of a vehicle and such a system and can be mounted behind a grill of a vehicle, thereby making installation very simple. Further, such a system protects the photocell 15 so that a little bit of dirt cannot obstruct the photocell 15. Further, the area of the translucent tube 20 is relatively large so that it can gather light over a larger area than that which would just impinge on the photocell 15 without the translucent tube 10.

As a further benefit of the present invention, the light that the photocell 15 "sees" i.e., the light which is passed into the translucent tube 10 and impinges on the photocell 15, is completely diffused so that the angle of mounting of the photocell system 5 of the present invention becomes virtually un-important. More particularly, the specific orientation that the photocell system 5 is located behind the grill is not at all critical, because the photocell 15 reads light which impinges on any portion of the translucent tube 10. That is, as the translucent tube 10 is large and diffuses light impinging thereon, the specific position of the photocell 15 is no longer critical. This aids significantly in mounting of the photocell system 5 of the present invention.

The device of the present invention operates sufficiently if the selection of the size and material of the translucent tube 10 is appropriate. To fully achieve the benefits of the present invention the photocell 15, which may typically be about ⅛ inches in diameter, should be located at an end of a translucent tube 10 which has an inside diameter also of about ⅛ inches, and an outside diameter of about ¼ inches. Such a translucent tube 10 should also have a length which is relatively long in comparison to its diameter and to the size of the photocell 15, and a length between 5 and 8 inches will typically provide beneficial results. Also, the material of the translucent tube 10 should be chosen from a material which will diffuse the light impinging thereon, such as natural polypropylene.

By utilizing such a specific device as in the present invention, a small amount of dirt will not effect the performance of the photocell system controller of the present invention, and such a photocell system controller can be easily mounted at an appropriate position. In this way, the device of the present invention can overcome the significant drawbacks of the conventional systems.

Shown below in Tables 2 and 3 are comparisons of photocell systems which are formed with and without the translucent tube 10 of the present invention.

Figure 2:
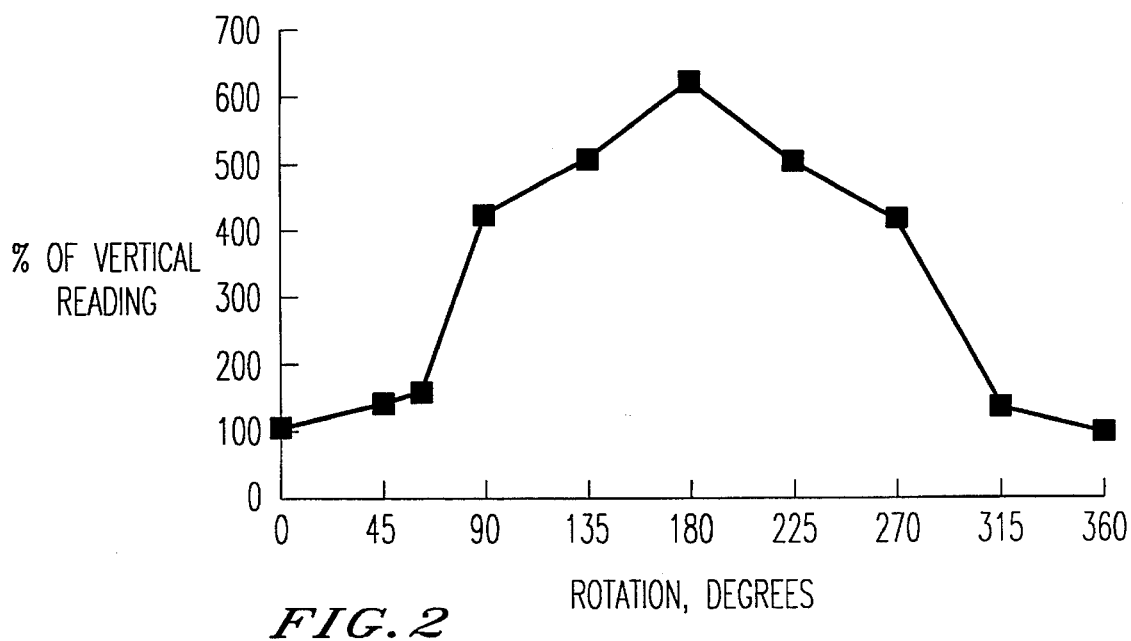
FIG. 2 shows performance characteristics of a photocell system without the features of the present invention.

More particularly, Table 2 shown below, and which data is also shown in corresponding FIG. 2, shows a photocell impedance of the photocell Model #NSL-5122 made by Silonix Inc. of Plattsburg, N.Y. (a typical photocell which may be used in such a system of the present invention) with the photocell alone, i.e., without being formed in a translucent tube as in the present invention. The photocell alone is rotated and a reading is taken every 45° along its rotation. The reading at 0° is an indication of the photocell being vertically facing directly into a three foot long fluorescent light which is located 18 inches above the photocell. As is clearly shown in Table 2 and FIG. 2, a significant difference and a decrease in performance is evident when the photocell is rotated 180°, i.e., when the photocell is facing in an opposite direction as the light source.

TABLE 2

| PLAIN PHOTOCELL - NO TUBE | | |
|---|---|---|
| Degrees from Vertical | Actual Reading (k-ohms) | % Of Vertical (0°) Reading |
| 0 | 1.3 | 100 |
| 45 | 1.8 | 138 |
| 90 | 5.4 | 415 |
| 135 | 6.5 | 500 |
| 180 | 8.0 | 615 |
| 225 | 6.5 | 500 |
| 270 | 5.4 | 415 |
| 315 | 1.8 | 138 |
| 360 | 1.3 | 100 |

As is clearly shown in Table 2 and corresponding FIG. 2, the difference between the reading of the photocell from 0° to 180° is a factor of 5. Such a difference demonstrates a very significant drop off based on different orientations of the photocell.

Figure 3:
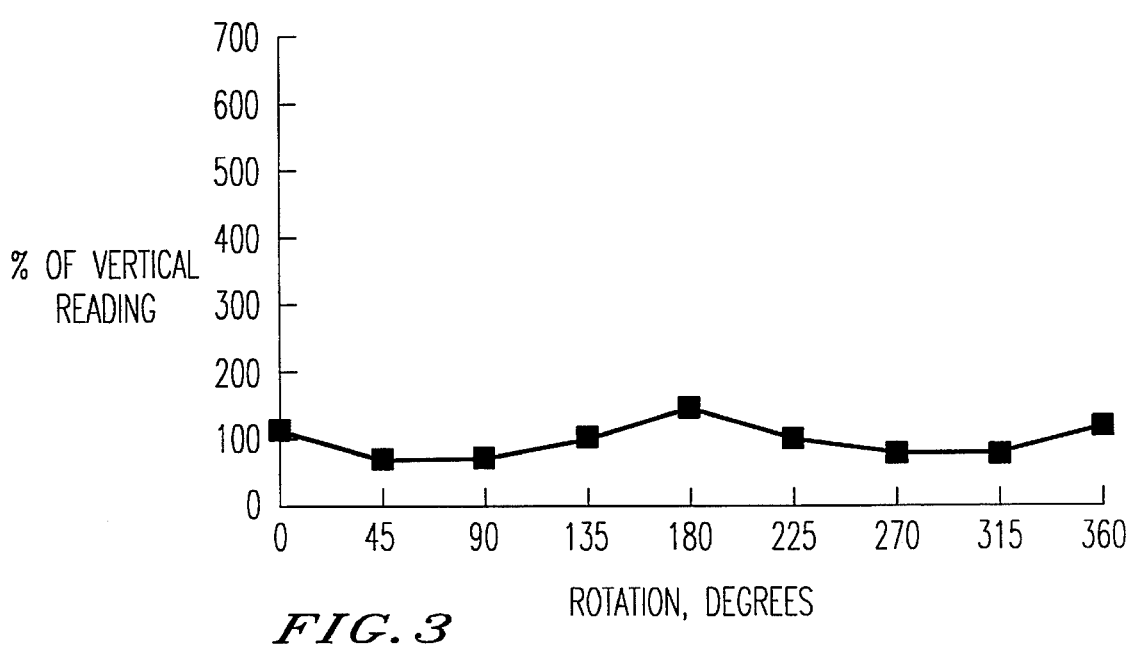
FIG. 3 shows performance characteristics from a photocell system under the same conditions as those of FIG. 2, but which includes the features of the present invention.

Table 3 and FIG. 3 below show a comparison to the results of Table 2 and FIG. 2 in that in Table 3 and FIG. 3 the same photocell was used and was also located the same distance from the same light source and was rotated at the same number of angles. However, the results shown in Table 3 and FIG. 3 are for a photocell system such as is shown in FIG. 1 of the present specification, i.e., a photocell system of the present invention in which the photocell 15 is mounted in a translucent tube 10. That is, in the device whose results are shown in Table 3 and FIG. 3, a system which features a translucent tube 10, silicon seals 25, 35, wire 30 and heat shrink tubing 20 was employed. In this comparison example, the translucent tube 10 was formed of natural polypropylene and had an inner diameter of ⅛ inches, an outer diameter of ¼ inches and a length of 5 inches.

TABLE 3

WITH DIFFUSING TUBE

| Degrees from Vertical | Actual Reading (k-ohms) | % Of Vertical (0°) Reading |
| --- | --- | --- |
| 0 | 4.8 | 100 |
| 45 | 2.8 | 58 |
| 90 | 2.9 | 60 |
| 135 | 4.3 | 90 |
| 180 | 6.5 | 135 |
| 225 | 4.3 | 90 |
| 270 | 2.9 | 60 |
| 315 | 2.8 | 58 |
| 360 | 4.8 | 100 |

As is clearly shown in Table 3 and FIG. 3, when utilizing the photocell system of the present invention as shown in FIG. 1, there is significantly less degradation in performance between any of the different angles of rotation of the photocell system. And particularly, as is shown in Table 3 and FIG. 3 of the present specification, there is not at all a significant drop off in performance at 180° from 0°. That is, when utilizing the photocell system 5 of the present invention such as is shown in FIG. 1, even when the photocell 15 is facing in a completely opposite direction as the light source, no significant drop off in detected light results, and a beneficial light detection operation can still be achieved. In this way, the device of the present invention provides significant advantages over conventional systems which do not utilize a photocell mounted in a translucent tube.

Figure 4:
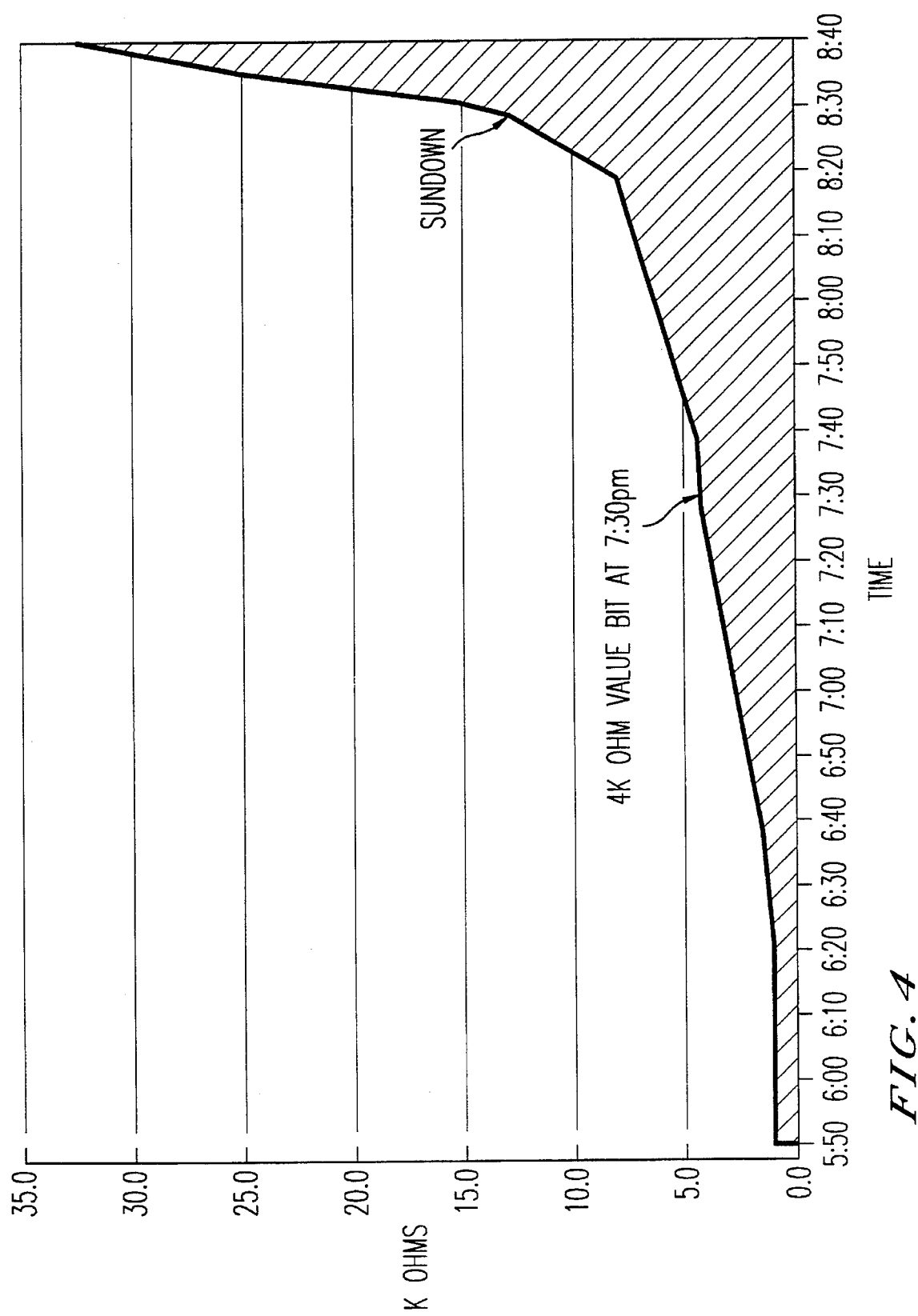
FIG. 4 shows light reading levels of an actual photocell system of the present invention.

Table 4 below, FIG. 4 showing the corresponding data of Table 4, shows light reading levels of an actual photocell system 5 of the present invention such as is shown in FIG. 1 from late afternoon (5:50 pm) until after dark, and in the Example shown in Table 4 and FIG. 4 sundown arrives at 8:30 pm.

TABLE 4

| Time | Resistance | |
| --- | --- | --- |
| 5:50 | 0.9 | K ohms |
| 6:00 | 0.9 | |
| 6:10 | 1.0 | |
| 6:20 | 1.0 | |
| 6:30 | 1.2 | |
| 6:40 | 1.5 | |
| 6:50 | 2.0 | |
| 7:00 | 2.6 | |
| 7:10 | 3.0 | |
| 7:20 | 3.5 | |
| 7:30 | 4.0 | |
| 7:40 | 4.2 | |
| 7:50 | 5.0 | |
| 8:00 | 5.7 | |
| 8:10 | 6.9 | |
| 8:20 | 7.7 | |
| 8:30 | 12.6 | Sundown |
| 8:40 | 32.3 | |
| 8:50 | 84.1 | |
| 9:00 | 254.0 | |
| 9:10 | 349.0 | |

As is shown in Table 4 and FIG. 4, impedance at the photocell output changes very quickly as sunset arrives. In a beneficial embodiment of the present invention, the headlight controller may be designed to activate the headlights when the reading out of the photocell, i.e. the resistance, reaches 4.0 KΩ, which will occur at about 7:30 pm just as it begins to get dark. As can be seen from Table 4 and FIG. 4, a 50% tolerance level would mean that the headlights would be activated at the earliest at 7:10 pm or at the latest at a little after 8:00 pm. A 100% tolerance level would activate the headlights at 6:50 pm or 8:20 pm, respectively. Any bigger tolerance levels from one mounting position to another, such as the 500% difference in using just a photocell without a translucent tube, such as is shown above in FIG. 2 and Table 2, would lead to some very extreme conditions causing grave safety concerns should the headlights not come on until after sunset. Therefore, the present invention provides a tolerance which is well within that acceptable to turn-on the headlights at an appropriate timing.

A further feature of the present invention is that the operator of the vehicle can determine whether the vehicle headlights should remain on for a predetermined period of time after the vehicle is turned off. That is, conventional headlight control systems often operate so that the vehicle headlights will remain on for a predetermined period of time, for example 30 seconds, after the vehicle is turned off. This provides the vehicle operator with some light when getting out of the vehicle. However, it may be that the vehicle operator does not desire to always use such a feature. The system of the present invention can provide a further advantage in allowing the vehicle operator control over this feature.

As the present invention already has control over the headlights of the vehicle, the present invention can provide a simple and efficient system for providing such a control. More particularly, according to the present invention, the voltage on the ignition sense wire is detected. A voltage will be on the ignition sense wire when the ignition key is turned to the ignition (or run) position. According to the present invention, when the vehicle operator is ready to depart the vehicle, the vehicle operator will turn off the vehicle, i.e. turn the key to the "off" position, and the vehicle headlights will go off. If the vehicle operator then turns the ignition key to the ignition (or run) position, then a voltage will be on the ignition sense wire. The present invention, as it is connected to the ignition sense wire, will sense such a voltage, and if such a voltage is detected within a predetermined period of time after the vehicle is turned off, for example two seconds, then the vehicle headlights will go on for a predetermined period of time, for example the 30 seconds. In this way, according to this further feature of the present invention, the vehicle operator will have control over whether the headlights should remain on for a predetermined period of time after the vehicle is turned off.

Figure 5:
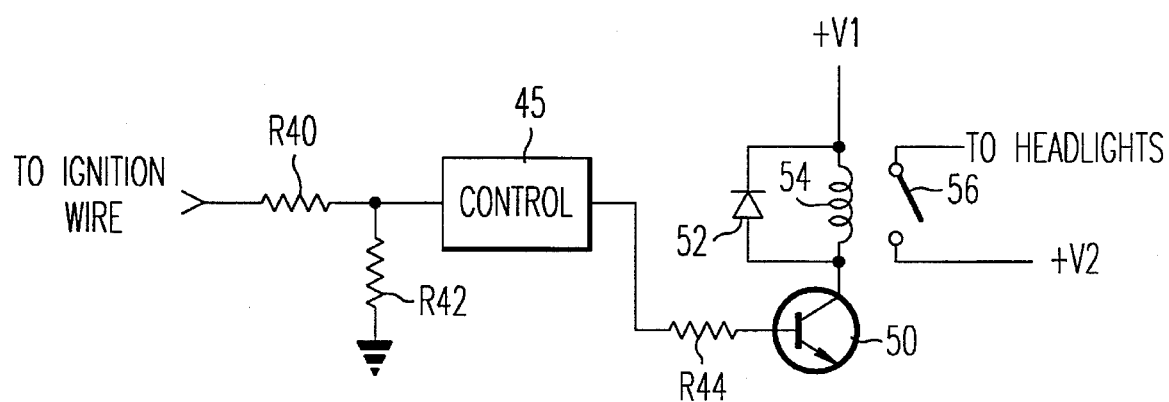
FIG. 5 shows a further feature of the present invention of a control circuit for allowing an operator to control whether vehicle headlights are to turn on after a vehicle is turned off.
Figure 6:
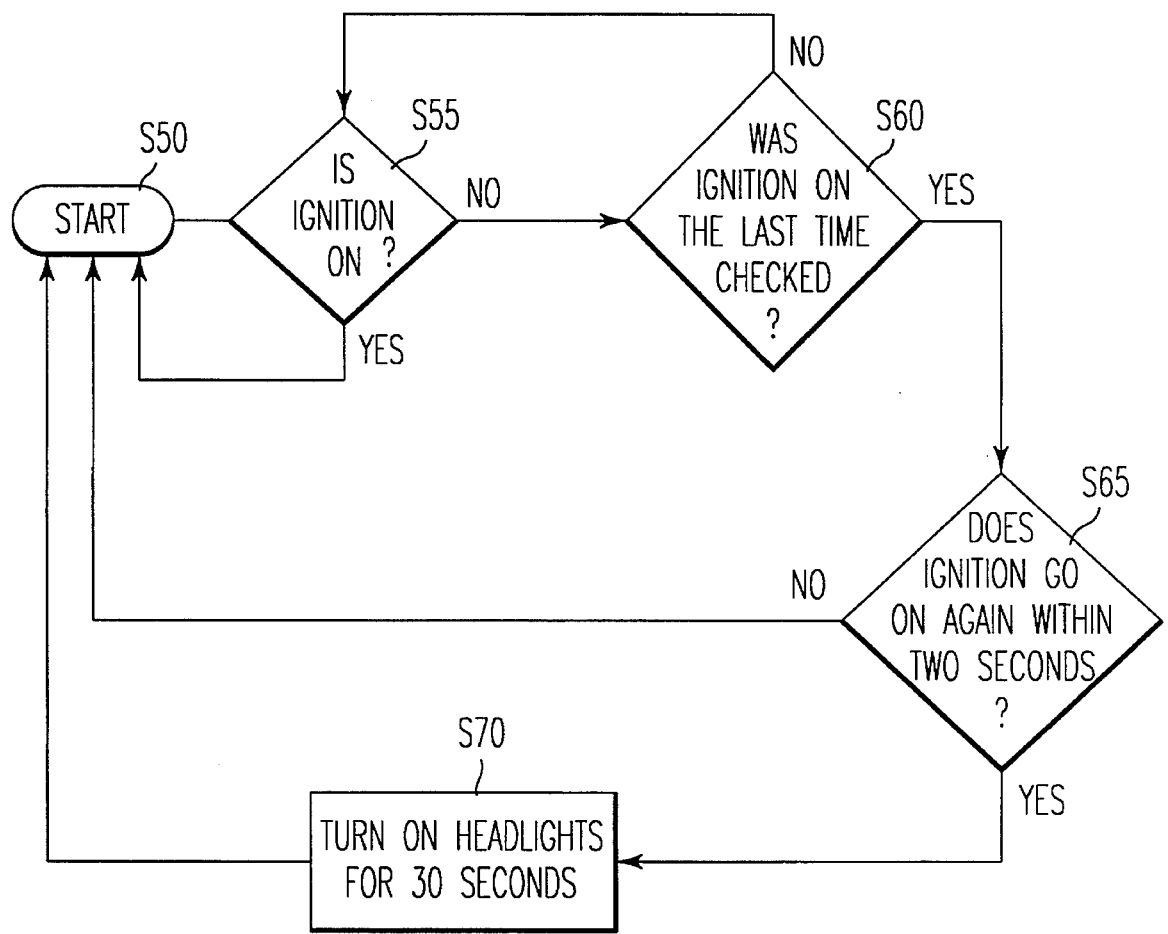
FIG. 6 shows a flow chart further explaining the operation of the circuit of FIG. 5.

FIG. 5 details a circuit which can incorporate this headlight control feature of the present invention, and the operation of the circuit of FIG. 5 is also shown in a flowchart in FIG. 6.

As is shown in FIG. 5, the headlight control circuit of the present invention is connected to an ignition wire. Two resistors R40 and R42 are connected to this input to the ignition wire, resistors R40 and R42 operating as a voltage divider. This input from the ignition wire is then passed through resistor R40 into a control circuit 45. An output of the control circuit 45 is then input into a transistor 50 through a further resistor R44. Connected between a voltage source V1, e.g. +5 volts, and the collector of transistor 50 is a parallel combination of a diode 52 and an inductive loop 54. Connected adjacent to this loop 54 is a relay switch 56, which may be a 10 amp relay as an example, which is in turn connected to the headlights and a voltage source V2, which may be the vehicle +12 volt source. As example values only, each of Resistors R40, R42, R44 may have a value of 10 KΩ. The operation of the device of FIG. 5 is as follows.

When a key of an ignition of a vehicle is placed in the ignition (or run) position, a voltage is placed on the ignition wire. This voltage is divided to an appropriate level for control 45 by voltage divider R40, R42. Control 45 determines whether the voltage on the ignition wire is sensed within two seconds of the vehicle being turned off. If the voltage is sensed within two seconds of the vehicle being turned off, control 45 outputs a signal to transistor 50 to turn on transistor 50. When transistor 50 is turned on, this causes a current to flow through loop 54 which in turn causes the relay 56 to close, to thereby supply power to the headlights. In this way, in this operation of the present invention, the vehicle headlights are turned on only when a key of the vehicle is turned to the ignition (or run) position within two seconds of the vehicle being turned off.

FIG. 6 details a flowchart of the operation of the control unit 45 of FIG. 5. As is shown in FIG. 6, after a start step S50 the controller will determine in step S55 whether the ignition is on. If the ignition is on, YES in step S55, the system returns to step S50. That is, according to the present invention, if the ignition is on it means that the vehicle is running and therefore the headlight control system of the present invention need not perform any functions. In step S50 when it is determined that the ignition is not on, NO in step S55, then the system proceeds to step S60.

In step S60 it is determined whether the ignition was on the previous time it was checked. If the ignition was not on the last time it was checked, NO in step 560, the system returns to step S55. If the ignition was on the last time it was checked, YES in step S60, the system proceeds to step S65. The YES in step 560 indicates that the vehicle has just been initially turned off. In step S65 it is determined whether the ignition again goes on within two seconds. If NO in step S65, then the system returns to the start step S50. If YES in step S65, the headlights are turned on in step S70 for a predetermined period of time, such as 30 seconds.

In this way, in this system of the present invention as set forth in FIGS. 5 and 6, an operator of a vehicle can control whether the vehicle headlights should be turned on for a predetermined period of time after the vehicle is turned off.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letter Patent of the United States is:

1. A photocell system for a vehicle automatic headlight controller comprising:

a translucent tube which diffuses light impinging thereon to generate diffused light and for being variably mountable in an after-market application; and a photocell formed inside the translucent tube, wherein the photocell detects the diffused light.

2. The photocell system according to claim 1, further comprising a seal on each end of the translucent tube.

3. The photocell system according to claim 1, wherein the translucent tube is formed of polypropylene.

4. The photocell system according to claim 2, wherein the translucent tube is formed of polypropylene.

5. The photocell system according to claim 1, further comprising:

an ignition sense wire detector for detecting a voltage on an ignition sense wire of the vehicle when an ignition of the vehicle is turned to an on position; and a control for turning on vehicle headlights when the ignition sense wire detector detects a voltage on the ignition sense wire within a predetermined period of time after the vehicle is turned off.

6. The photocell system according to claim 3, further comprising:

an ignition sense wire detector for detecting a voltage on an ignition sense wire of the vehicle when an ignition of the vehicle is turned to an on position; and a control for turning on vehicle headlights when the ignition sense wire detector detects a voltage on the ignition sense wire within a predetermined period of time after the vehicle is turned off.

7. A photocell system for an automatic head lamp controller comprising:

a translucent means for diffusing light impinging thereon to generate diffused light and for being variably mountable in an after-market application; and a light detecting means formed inside the translucent means for detecting the diffused light.

8. The photocell system according to claim 7, further comprising a sealing means on each end of the translucent means.

9. The photocell system according to claim 7, wherein the translucent means is formed of polypropylene.

10. The photocell system according to claim 8, wherein the translucent means is formed of polypropylene.

11. The photocell system according to claim 7, further comprising:

an ignition sense wire detecting means for detecting a voltage on an ignition sense wire of the vehicle when an ignition of the vehicle is turned to an on position; and a control means for turning on vehicle headlights when the ignition sense wire detecting means detects a voltage on the ignition sense wire within a predetermined period of time after the vehicle is turned off.

12. The photocell system according to claim 8, further comprising:

an ignition sense wire detecting means for detecting a voltage on an ignition sense wire of the vehicle when an ignition of the vehicle is turned to an on position; and a control means for turning on vehicle headlights when the ignition sense wire detecting means detects a voltage on the ignition sense wire within a predetermined period of time after the vehicle is turned off.

13. A vehicle headlight control system comprising:

an ignition sense wire detector for detecting a voltage on an ignition sense wire of the vehicle when an ignition of the vehicle is turned to an on position; and a control means for turning on vehicle headlights when the ignition sense wire detector detects a voltage on the ignition sense wire within a predetermined period of time after the vehicle is turned off.

* * * * *